United States Patent [19]

Palajac et al.

[11] Patent Number: 5,741,043
[45] Date of Patent: Apr. 21, 1998

[54] VEHICLE WINDOW ASSEMBLY

[75] Inventors: Patrick M. Palajac, Dearborn; Sandy J. Emerling, Troy, both of Mich.

[73] Assignee: Chrysler Corporation, Auburn Hills, Mich.

[21] Appl. No.: 582,547

[22] Filed: Jan. 3, 1996

[51] Int. Cl.⁶ .................................................. B60J 1/18
[52] U.S. Cl. ........................ 296/201; 296/147; 296/96.2
[58] Field of Search ........................... 296/201, 96.21, 296/147, 84.1, 90, 92, 96.2

[56] References Cited

U.S. PATENT DOCUMENTS

| | | | |
|---|---|---|---|
| 4,116,483 | 9/1978 | Kramer et al. | 296/96.2 X |
| 4,358,151 | 11/1982 | Wood | 296/146.16 |
| 4,396,221 | 8/1983 | Morgan et al. | 296/84 |
| 4,518,195 | 5/1985 | Tindall et al. | 296/96.21 X |
| 4,615,931 | 10/1986 | Matsuyoshi et al. | 296/146.16 X |
| 4,715,647 | 12/1987 | Mynott et al. | 296/201 X |
| 5,058,944 | 10/1991 | Kim | 296/146.16 |

FOREIGN PATENT DOCUMENTS 0 646 483  4/1995  European Pat. Off. .

*Primary Examiner*—Joseph D. Pape
*Attorney, Agent, or Firm*—William J. Coughlin

[57] ABSTRACT

A window assembly specifically for the rear hatch opening of a motor vehicle is provided which is pivotally moveable between an open position and includes an exterior surface mounted completely flush with adjacent surfaces of the vehicle body. In a preferred embodiment, a mounting bracket interconnects an adjustable support member and a glass panel of the window assembly through an adhesive bond. The mounting bracket includes a generally planar mounting portion and a tab portion. The mounting portion is generally curvilinear with the laterally opposing sides in parallel relationship to one another. The curvilinear configuration of the mounting portion functions to oppose a bending moment imparted by the adjustable support member as a result of pivotal movement of the glass panel between its open and closed positions.

20 Claims, 3 Drawing Sheets

VEHICLE WINDOW ASSEMBLY

BACKGROUND OF THE INVENTION

1. Field of the Invention

The present invention generally relates to a window assembly for a motor vehicle. More particularly, the present invention relates to a window assembly mounted within a vehicle opening for pivotal movement between an open position and a closed position. The window assembly preferably includes a mounting bracket having a curvilinear mounting portion interconnecting an adjustable support member and a glass panel through an adhesive bond.

2. Description of the Prior Art

It is well known in the art to articulately mount glass panels to motor vehicle bodies for pivotal movement between an open position and a closed position. For example, common applications for pivotally mounted vehicle glass panels include side windows for vans and rear lift gate windows for vans, station wagons, sport utility vehicles, trucks and the like. The strength requirements for the mechanical interconnection between the vehicle body and the glass panel are primarily dependent upon the size of the glass panel and loads that the glass panel will experience during vehicle travel, as well as loads that the glass panel will experience as it is manually articulated between its open and closed positions.

Conventional articulated or hinged vehicle windows are fixed to the vehicle body through a mounting assembly which is fastened to the glass panel by a plurality of bolts or studs that pass through holes drilled through the glass panel. A low profile nut is then threaded onto the stud extending through the glass panel to retain the glass panel thereon. Undesirably, the resulting outer surface of the window assembly is not truly flush with adjacent portions of the vehicle exterior. In this regard, the mounting hardware creates a positive relief with respect to the panel exterior surface.

Another major disadvantage with such a mounting arrangement is that a significant number of glass panels are broken or otherwise damaged as a result of drilling the holes through the glass panel. The glass panels are also often broken during or after mounting of the mounting hardware. Furthermore, such incidents of glass panel breakage are primarily attributable to localized areas of stress which develop adjacent the holes drilled through the glass panel. To lessen the occurrence of broken glass panels, sophisticated techniques have been adopted for drilling of the holes. Also, the mounting hardware has been adapted to reduce breakage. However, the price of such window assemblies remains considerably inflated due to the labor intensive process of drilling the holes in the glass panels and the additional components added to conventional mounting hardware to reduce breakage. Furthermore, streamline appearance of the exterior surface remains interrupted bolt heads or bolt head covers.

In an effort to reduce glass panel breakage and to also eliminate any exterior protrusions from the exterior profile of pivotally mounted window assemblies, various attempts have been made to eliminate bolt mounting of hardware to glass panels. For example, the window assembly disclosed in U.S. Pat. No. 4,396,221 employs a channel extending around the edge of the glass panel. A huge plate includes a flexible and resilient portion is provided which allows pivotal movement of the glass panel. One of several types of fasteners engage the channel. Such fasteners include a clip with a detent received in the seal and securing the hinge and thus the assembly to a pinch weld flange. Disadvantageously, the hinge member is fixed to the exterior surface of the panel and is visible from the exterior of the vehicle.

Through advanced adhesive technology, it is also known in the art to bond metal and glass for a variety of applications. For example, European Patent Application No. 94307205.8, published on Apr. 5, 1995 as Publ. No. 0 646 483 A1, teaches an articulated window assembly for use in a vehicle which includes a glass panel and at least one window-mounting member bonded by two separate adhesives to an inner surface of the glass panel. The mounting member includes projections which space the mounting member from the inner surface of the glass panel, and/or perforations which allow air and moisture to reach the space provided between the mounting member and the inner sheet surface. A first adhesive temporarily fixtures the mounting member to the glass panel. A second adhesive permanently bonds the mounting member to the inner surface of the glass panel. The remainder of the teachings of European Patent Application No. 94307205.8 are hereby incorporated by reference as if fully set forth herein.

While prior known techniques for the adhesive bonding of metal to glass, including the teachings set forth in European Patent Application No. 94307205.8, have proven to be commercially acceptable for a wide range of applications, they are all subject to improvement. For example, prior known techniques are generally not suitable for the adhesive bonding of metal or plastic mounting structure to glass panels for larger and heavier window assemblies such as vehicle rear hatch windows for modern sports cars and the like. Such larger and heavier window assemblies may approach two thousand (2000) square inches or more in area and which may weigh thirty pounds or more. The greater size and weight of such a window assembly transmits more severe vibration to the mounting structure requiring greater strength and greater long-term environmental resilience and durability than is available with such prior known bonding techniques. In this regard, while not specifically limited thereto, the teachings of European Patent Application No. 94307205.8 are primarily directed to vehicle window applications such as pivotally mounted side windows for vans and other window assemblies including smaller sized glass panels.

Accordingly, there is a need for an improved mounting arrangement for the attachment of large glass panels to vehicle bodies for applications such as rear hatch back window assemblies having a flush mounted hinge.

SUMMARY OF THE INVENTION

Thus, it is a principal object of the present invention to provide a rear hatch window assembly for a vehicle which is pivotally moveable between an open position and a closed position and which includes mounting members that do not require any structure extending into or through holes drilled thought the glass panel, yet provides a strong and resilient adhesive bond between the glass panel and the vehicle.

It is a related object of the present invention to eliminate areas of localized stress in glass panels for window assemblies and thereby reduce the occurrence of glass panel breakage for larger size and weight vehicle window assemblies by eliminating attachment holes conventionally used to attach mounting brackets.

It is an additional object of the present invention to provide a mounting arrangement for a window assembly which may be manufactured quickly, easily and inexpensively.

It is a further object of the present invention to provide a window assembly for a vehicle rear hatch application in which the mounting members are concealed on the inner surface of the glass panel, thereby resulting in a flush, more streamlined and aesthetically pleasing window assembly appearance.

In one form, the present invention is specifically directed to a window assembly mounted within a rear hatch window opening formed in the body of a vehicle. The window assembly includes a glass panel having an inner surface and a peripheral edge having a pair of side portion. The glass panel is pivotally moveable between a closed position and an open position.

The window assembly additionally includes an adjustable support member for supporting the glass panel in its open position. The adjustable support member adjustably interconnects the glass panel and the body of the vehicle. A first end of the adjustable support member is attached to the body of the vehicle.

The window assembly further includes a mounting bracket including a curvilinear mounting portion mounted to the inner surface of the glass panel through an adhesive bond and without any structure extending into or through the glass panel. The mounting bracket further includes a tab portion pivotally interconnected to a second end of the adjustable support member and a pair of laterally opposing side.

BRIEF DESCRIPTION OF THE DRAWINGS

Additional objects and advantages of the present invention will become apparent from a reading of the following detailed description of the preferred embodiment which makes reference to the drawings of which.

DETAILED DESCRIPTION OF THE PREFERRED EMBODIMENT

As required, a detailed embodiment of the present invention is disclosed herein. However, it is to be understood that the disclosed embodiment is merely exemplary of the present invention which may be embodied in various forms. Therefore, specific functional and structural details disclosed herein are not to be interpreted as limiting, but merely as a basis for the claims appended hereto and as a representative basis for teaching one skilled in the art to variously employ the present invention in virtually any appropriately detailed structure.

Figure 1:
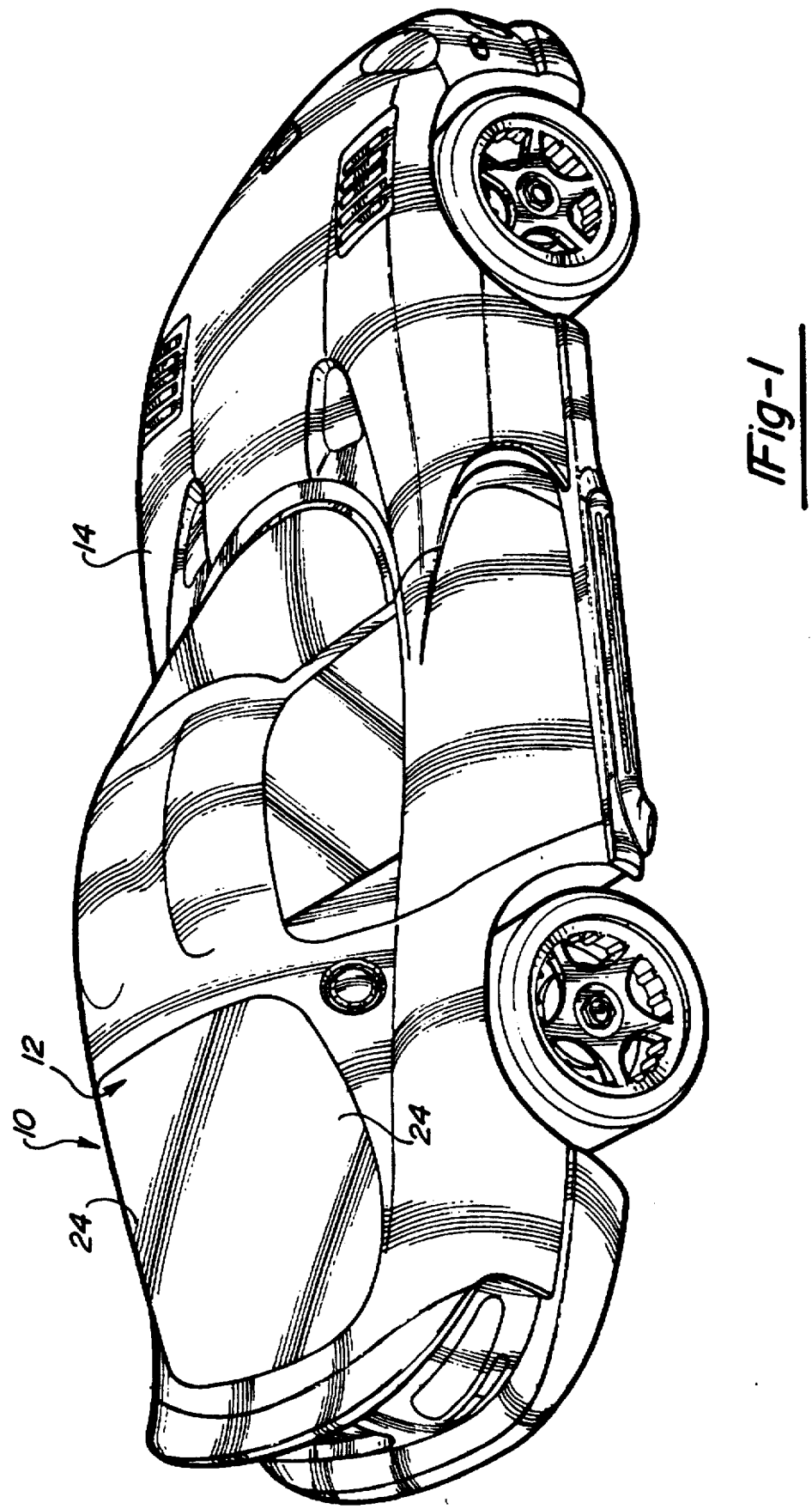
FIG. 1 is a rear perspective view of an exemplary vehicle incorporating a window assembly for a rear hatch opening constructed in accordance with the teachings of the preferred embodiment of the present invention, illustrated with the glass panel rotated to a closed position.
Figure 2:
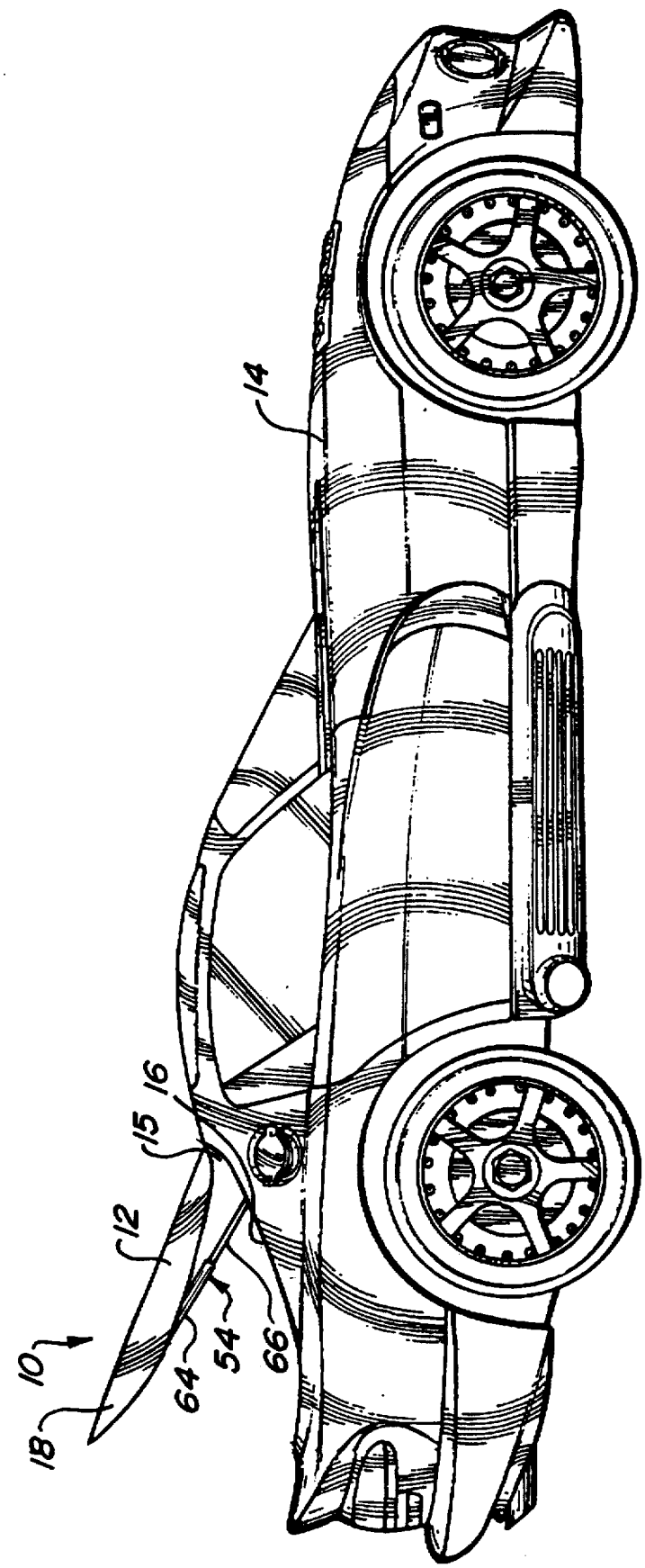
FIG. 2 is a side view of the exemplary vehicle of FIG. 1, illustrated with the glass panel rotated to an open position.

Turning generally to the drawings in which identical or equivalent elements have been denoted with like reference numerals and specifically to FIGS. 1 and 2 thereof, a window assembly embodying the present invention is identified generally with reference numeral 10. The window assembly 10 is shown to include a transparent sheet of glass or glass panel 12 which is incorporated into an exemplary vehicle 14 and which serves as a back light or rear hatch. From the remainder of this detailed description of the preferred embodiment, it will become apparent to those skilled in the art that the teachings of the present invention are also applicable to other applications, including but not limited to window assemblies for vans, station wagons, sport utility vehicles, trucks and the like.

The window assembly 10 is disposed on the vehicle 14 within a rear hatch opening 16 formed in the body of the vehicle 14. In a conventional manner, the window assembly 10 is mounted to the vehicle body through a pair of hinges 15 for movement between a closed position (shown in FIG. 1) and an open position (shown in FIG. 2). When the window assembly 10 is in its open position, exterior access to a rearwardly located storage area (not specifically shown) of the vehicle 14 is provided. When the window assembly 10 is in its closed position, access to the rear storage area is prevented and the exterior of the glass panel 12 is mounted flush with the vehicle exterior.

Figure 3:
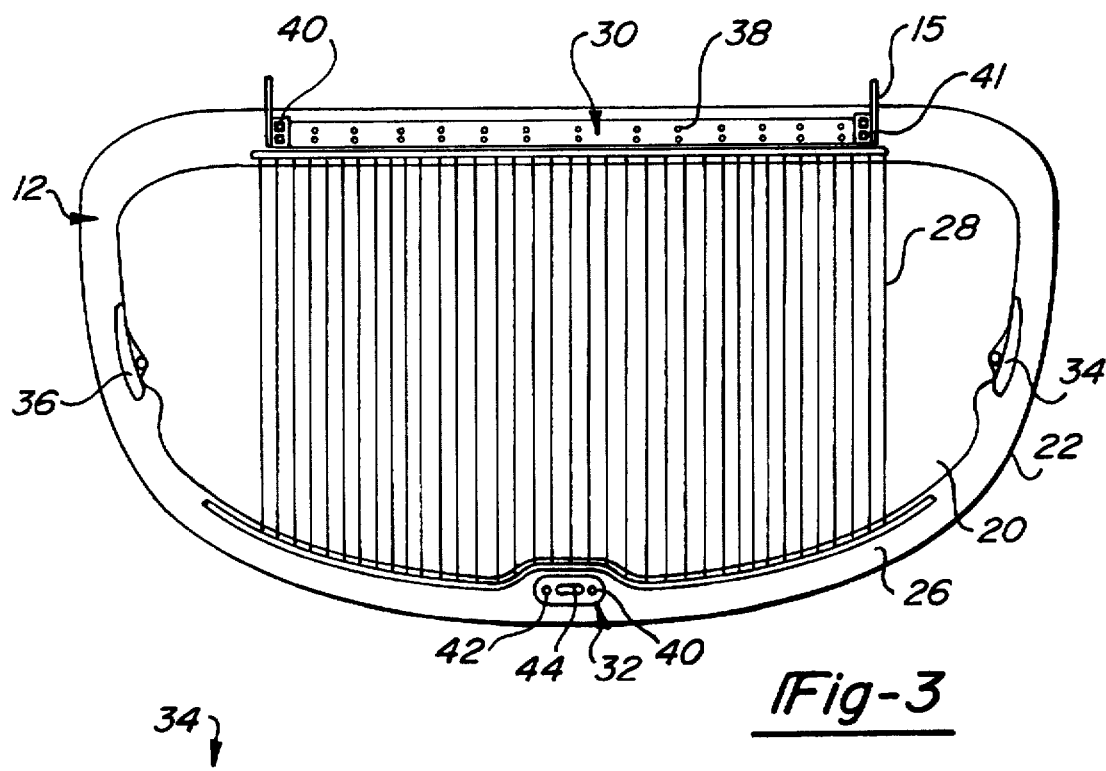
FIG. 3 is a rear plan view of the window assembly illustrating the plurality of mounting brackets adhesively attached to the glass panel.

With continued reference to FIGS. 1 and 2 and additional reference to the rear plan view of the glass panel 12 in FIG. 3, the glass panel 12 is shown to include an outer surface 18 and an inner surface 20. The glass panel 12 may be curved, bent or generally planar, having two substantially parallel sides, surfaces or faces terminating in a peripheral edge 22 forming a panel having a predetermined shape. In the embodiment illustrated, the glass panel 12 includes a pair of laterally opposed sides 24 (designated in FIG. 1) which curve inwardly so as to provide a continuous glass surface which transitions between the rear of the vehicle 14 and the sides of the vehicle 14. The predetermined shape of the glass panel 12 is adapted to cooperate with the rear hatch opening 16 in the vehicle exterior for sealing the vehicle 14 from the elements and from unauthorized access.

In one application, the maximum width (i.e. the lateral dimension relative to the vehicle 14) of the glass panel 12 is approximately 55 inches and the maximum length (i.e. the longitudinal dimension relative to the vehicle 14) is approximately 36 inches. In this application, the weight of the glass panel 12 is approximately 34 pounds. Thus, it is apparent that the window assembly 10 is significantly larger and heavier than prior window assemblies which have been mounted to vehicle bodies solely through an adhesive bond. As shown most clearly in FIG. 1, the glass panel 12 is oriented such that it inclines as it advances forwardly relative to the body of the vehicle 14.

As illustrated in FIG. 3, an opaque ceramic frit layer 26 is deposited on and bonded to the inner surface 20 of the glass panel 12. The ceramic frit layer 26 or coating covers and conceals a region of the inner surface 20 adjacent the peripheral edge 22 inward and preferably forms a continuous strip about the entire perimeter of the glass panel 12. When viewed from the outer side, the transparent thickness of the glass panel 12 backed up by the opaque ceramic frit layer 26 provides an appearance of depth and richness which blends well with the surrounding painted or glass areas on the vehicle 14. As illustrated, the inner surface of the glass panel 12 also includes a conventional arrangement 28 for supplying an electrical current to the window assembly 10 for defrosting the glass panel 12.

As noted above, the glass panel 12 is preferably transparent glass. However, other sheet-like panel materials may alternatively be used. For example, other materials, such as opaque or coated glass, transparent coated or opaque plastic materials, or multi-composite laminates, such as transparent glass and plastic, may be incorporated. The transparent glass may be tempered, laminated, or otherwise strengthened using conventional techniques and principles.

Fixed to the ceramic frit layer 26 on the inner side 20 of the glass panel 12 are a plurality of mounting members 30, 32, 34, and 36 for interconnecting the glass panel 12 and the body of the vehicle 14. Each of the mounting members 30–36 is spaced inwardly from the peripheral edge 22 toward the center of the glass panel 12 and attached to the glass panel 12 through an adhesive bond. The adhesive bond may be established by any suitable technique known in the art, including but not limited to the technique disclosed in European Patent Application No. 94307205.8.

In one application, each of the mounting members 30–36 is 0.1 to 10.0 millimeter (mm) thick, and preferably 0.5 to 1.0 mm thick, 1050 spring steel. The mounting members 30–36 may be prestressed or bent to conform to the surface of configuration of the glass panel 12, especially if the glass panel 12 is curved. This pre-stressing or bending of the mounting members 30–36 results a more uniform adhesive bond. In addition, this pre-stressing or bending also evenly distributes any load along the bonding surface and economizes the amount of adhesive necessary to establish a sufficient bond.

In the embodiment illustrated, the plurality of mounting members 30–36 is illustrated to include a first mounting member in the form of a hinge bracket member 30 adhesively attached to the frit layer 26 adjacent to the upper portion of the peripheral edge 22 and a second mounting member in the form of a striker bracket member 32. The hinge bracket member 30 and striker bracket member 32 are generally planar in construction and are each formed to include a plurality of rearwardly extending embossments 38. The embossments 38 are shown in FIG. 3 from the front and appear as cylindrical depressions. The rearwardly extending embossments 38 (shown with respect to the hinge mounting bracket 30 only) function to provide a predetermined space between the mounting members 30 and 32 and the glass panel 12 and further provide an additional mechanical surface to bond with the adhesive and aid in bonding the hinge bracket member 30 and the striker bracket member 32 to the glass panel 12. The embossments 38 extend from the rear surface (not shown) of the hinge bracket member 30 and the striker bracket member 32 by a distance on the order of 0.1 to 3.0 mm, and preferably 1.0 mm. The actual distance may vary depending on the type of adhesive used. The embossments 38 may be easily formed in the hinge bracket member 30 and the striker bracket member 32 by stamping or punching process during formation of the bracket members 30 and 32.

With continued reference to FIG. 3, the hinge bracket member 30 is illustrated to include a pair of threaded rod portions 40 extending from adjacent each end thereof. The threaded rod portions 40 pass through apertures (not specifically shown) formed in hinge hardware 15 which functions in a conventional manner to articulately interconnect the glass panel 12 and the vehicle 14 for pivotal movement about a generally horizontal pivot axis. Nuts 41 or retaining clips are threaded on the threaded rod portions 40 to retain the hinge hardware against the hinge bracket member 30, and thus adjacent the glass panel 12. Although window assembly 10 is shown mounted to pivot about an axis proximate to an upper portion of the peripheral edge 22, it is contemplated that the teachings of the present invention may also be used to articulate glass panels about an axis which is vertically disposed.

Similar to the hinge bracket member 30, the striker bracket member 32 is formed to include a pair of outwardly extending threaded rod portions 40. The threaded rod portions 40 pass through apertures (not specifically shown) formed in a plate 42 which carries a striker bar 44. The striker bar 44 is adapted to conventionally cooperate with a latch mechanism (not shown) attached to the body of the vehicle 14 for selectively retaining the window assembly 10 in its closed position. Further in a conventional manner, the operation of the latch mechanism is controlled by a key or remote control device to restrict entry through the rear hatch opening 16 of the vehicle 14.

Figure 4:
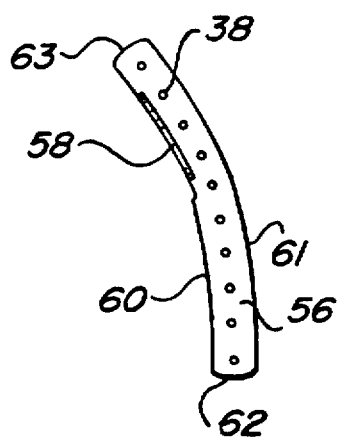
FIG. 4 is an enlarged front view of one of the side mounting brackets of FIG. 3.
Figure 5:
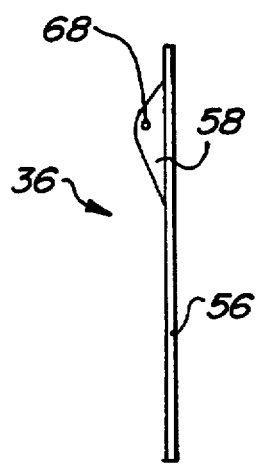
FIG. 5 is a side view of the side mounting bracket of FIG. 4.

With continued reference to FIG. 3 and additional reference to FIGS. 4 and 5, the plurality of mounting members of the window assembly 10 is shown to further include third and fourth mounting members in the form of a pair of side mounting brackets 34 and 36. Each of the side mounting brackets 34 and 36 functions to adjustably interconnect the glass panel 12 with the body of the vehicle 14 through an adjustable support member 54 which operates to support the glass panel 12 in its open position.

As illustrated in FIG. 3, the side mounting brackets 34 and 36 are mirror images of one another about a longitudinal centerline of the vehicle 14 and are adhesively bonded to the glass panel 12 adjacent opposite lateral side portions of the periphery 22 of glass panel 12. Thus, while the following portion of this detailed description will be primarily directed to the construction and operation of the first side mounting brackets 34, a thorough understanding of the second side mounting bracket 36 will be apparent therefrom.

The side mounting bracket 34 is integrally formed to include an elongated mounting portion 56 and an adjoining tab portion 58. In one application, the elongated mounting portion 56 of the side mounting bracket 34 is approximately between 4 and 10 inches in length and 0.5 and 2.0 inches in width. Preferably, the side mounting bracket 34 is approximately 8.5 inches in length and 0.75 inches in width. Similar to the hinge mounting bracket 30 and the striker mounting bracket 32, the elongated mounting portion 56 of the side mounting brackets 34 and 36 are formed to include a series of embossments 38 which functions to provide a predetermined space between the elongated mounting portion 56 and the glass panel 12 and further provides an additional mechanical surface to bond with the adhesive and aid in bonding the side mounting bracket 34 to the glass panel 12.

In the preferred embodiment, the elongated mounting portion 56 is shown in the plan view of FIG. 4 to be generally curvilinear with spaced apart sides 60 and 61 which are parallel to one another. As shown, first and second ends 62 and 63 of the elongated mounting portion 56 curve inwardly toward the center of the glass panel 12. As will become apparent below, the curvilinear configuration of the elongated mounting portion 56 functions to oppose a bending moment that is imparted to the side mounting bracket 34 from the adjustable support member 54 as the glass panel 12 is rotated between its open and closed positions. Due to the inward curvature of the laterally opposed sides 24 of the glass panel, the elongated mounting portion 56 of the side mounting bracket 34 lies within a plane rotated approximately 45 degrees inwardly from a vertical plane. As a result of this orientation of the mounting portion 56 of side mounting bracket 34, the adjustable support member 54 necessarily imparts a bending moment to the side mounting bracket 34. The inward curvature of the first and second ends 62 and 63 of the elongated mounting portion opposes this bending moment, thereby strengthening the mechanical interconnection between the side mounting bracket 34 and the glass panel 12.

While the elongated mounting portion 56 is illustrated to be curvilinear in configuration, it will be appreciated by those skilled in the art that variations therefrom are within the scope of the present invention. In this regard, the elongated mounting portion 56 can alternatively be of any configuration sufficient to oppose the bending movement imparted by the adjustable support member 54 without adversely effecting the bond between the side mounting bracket 34 and the glass panel 12. For example, the elongated mounting portion 56 can alteratively be L-shaped with an inwardly extending leg. However, in most applications, the curvilinear construction of the elongated mounting portion 56 will be preferred so that the surface area of the adhesive bond may be maximized and the side mounting bracket 34 may be concealed within the frit layer 26 of the glass panel 12.

The adjoining tab portion 58 of side mounting bracket 34 is bent to an angle of approximately 90 degrees with respect to the elongated mounting portion 56. In the embodiment illustrated, the adjoining tab portion 58 is located on the inner side 60 of the elongated mounting portion 56 and is generally triangular in configuration, tapering toward a forward edge of the glass panel 12.

The adjustable support member 54 preferably comprises a gas prop 54 and is generally conventional in construction. Alternatively, the adjustable support member 54 may comprise a foldable support including a pair of hinged links. Briefly, the gas prop 54 includes a main body portion 64 and an arm 66 extendable therefrom. The main body portion 64 of the gas prop 54 is pivotally interconnected with an aperture 68 formed in the tab portion 58 of the side mounting bracket 34 in any suitable manner well known in the art. Similarly, the main body portion 64 of the gas prop 54 is pivotally attached to the body of vehicle 14 in a conventional manner.

Upon rotation of window assembly 10 to its closed position, as shown in FIG. 1, the arm 66 of the gas prop 54 is retracted. The internal construction of the main body portion 64 of the gas prop 54 is damped so as to oppose retraction of the extendable arm 66 and support the glass panel 12 as it is rotated from its closed position to its open position. The gas prop 54 is damped to such a degree so as to provide sufficient resistance for supporting the glass panel 12 without requiring more than moderate urging by an operator to pivot the glass panel 12 from its open position to its closed position.

As illustrated in FIG. 3, each the mounting members 30–36 (e.g. the hinge bracket 30, the striker bracket 32 and the first and second side mounting brackets 34 and 36) are adhesively bonded to the inner surface of the glass panel 12 within the border defined by the opaque ceramic frit layer 26. As a result, the mounting members are not visible from the exterior or the vehicle 14 when the window assembly 10 is rotated to its closed position. Although the mounting brackets have been described as being constructed of spring steel, other materials may also be employed. For example, cold rolled steel, plastics, composite materials and other materials which are capable of withstanding flexural or bending moments may be alternative used. These materials will be apparent to one of ordinary skill in the art.

With the window assembly 10 in its closed position as illustrated in FIG. 1, access to the rear storage area of the vehicle 14 is gained by unlatching the hatch latch mechanism with a key or remote control device. Upon unlatching, the internal construction of the adjustable support member 54 biases the glass panel to its opened position illustrated in FIG. 2. As the glass panel 12 rotates from its closed position to its opened position, the arm 66 of the adjustable support member 54 extends from the main body portion 64 and the first and second ends of the adjustable support member are permitted to rotate relative to the body of the vehicle 14 and the side mounting bracketing 34, respectively. The window assembly 10 is moved from its opened position to its closed position by application of a manual force to the exterior side 18 of glass panel 12. Upon application of such a manual force, the arm 66 of the adjustable support member 54 is urged to its retracted position. The interconnection of the adjustable support member 54 with the side mounting bracket 34 results in a bending moment imparted to the side mounting bracket 34. This bending moment is opposed by the inward curvature of the first and second ends 62 and 63 of the elongated mounting portion 56 sufficiently so that the bond between the side mounting bracket 34 and the glass panel 12 is not adversely effected. Upon reaching the closed position, the glass panel is latched in place by the rear hatch latch mechanism of the vehicle 14.

While the above description constitutes the preferred embodiment of the invention, it will be appreciated that the invention is susceptible to modification, variation, and change without departing from the proper scope or fair meaning of the accompanying claims.

What is claimed is:

1. A window assembly mounted within a rear hatch window opening formed in the body of a vehicle, the window assembly including:

a glass panel including an inner surface and a peripheral edge having a pair of side portions, said glass panel pivotally moveable between a closed position and an open position;

an adjustable support member for supporting said glass panel in said open position, said adjustable support member interconnecting said glass panel and the body of the vehicle, a first end of said adjustable support member being attached to the body of the vehicle; and a mounting bracket for interconnecting said adjustable support member and said glass panel of said mounting bracket including a mounting portion mounted to said inner surface of said glass panel through an adhesive bond and without any structure extending into or through said glass panel, said mounting portion being elongated in a direction substantially parallel to a longitudinal centerline of the vehicle and having an end extending toward said longitudinal centerline such that said end functions to oppose a bending moment introduced by said adjustable support member.

2. The window assembly of claim 1, further including a tab portion pivotally interconnected to a second end of said adjustable support member, said tab portion being integrally formed with mounting portion.

3. The window assembly of claim 1, wherein said inner surface of said glass panel is concavely curved in a direction perpendicular to the longitudinal axis of the vehicle.

4. The window assembly of claim 3, wherein said mounting portion includes first and second arcuate edges, said first and second arcuate edges being generally parallel to one another.

5. The window assembly of claim 4, wherein said mounting portion includes a plurality of spaced apart embossments extending toward said glass panel.

6. The window assembly of claim 5, wherein said tab portion outwardly extends from said mounting portion adjacent said first arcuate edge.

7. The window assembly of claim 6, wherein said first arcuate edge is an inner arcuate edge.

8. A window assembly mounted within a rear hatch window opening formed in the body of a vehicle, the window assembly including:

a glass panel including an inner surface and a peripheral edge having a pair of side portions, said glass panel pivotally moveable between a closed position and an open position;

first and second adjustable support members for supporting said glass panel in said open position, said first and second adjustable support members interconnecting said glass panel and the body of the vehicle; and first and second mounting brackets, said first and second mounting brackets each including a curvilinear mounting portion mounted to said inner surface of said glass panel through an adhesive bond and without any structure extending into or through said glass panel, said first and second mounting brackets each further including a tab portion pivotally interconnected to a second end of each of said first and second adjustable support member.

9. The window assembly of claim 8, wherein said tab portion of each of said mounting brackets is integrally formed with said curvilinear mounting portion.

10. The window assembly of claim 9, wherein said inner surface of said glass panel is concavely curved in a direction perpendicular to the longitudinal axis of the vehicle.

11. The window assembly of claim 10, wherein each said curvilinear mounting portion includes first and second arcuate edges, said first and second arcuate edges being generally parallel to one another.

12. The window assembly of claim 11, wherein each of said curvilinear mounting portions of said first and second mounting brackets includes a plurality of spaced apart embossments extending toward said glass panel.

13. The window assembly of claim 12, wherein each of said tab portions of said mounting brackets outwardly extends from its respective curvilinear mounting portion adjacent said first arcuate edge.

14. The window assembly of claim 13, wherein said first arcuate edges are inner arcuate edges.

15. A window assembly mounted within a rear hatch window opening formed in the body of a vehicle, the window assembly including:

a glass panel including an inner surface and a peripheral edge having a pair of side portions, said glass panel pivotally movable between a closed position and an open position;

an adjustable support member including a main body portion and an extendable arm telescopically received by the main body portion, said adjustable support member interconnecting said glass panel and the body of the vehicle; and a mounting bracket for interconnecting said adjustable support member and said glass panel of said mounting bracket including a curvilinear mounting portion mounted to said inner surface of said glass panel through an adhesive bond and without any structure extending into or through said glass panel, said mounting portion being elongated in a direction substantially parallel to a longitudinal centerline of the vehicle and having an end extending toward said longitudinal centerline such that said end functions to oppose a bending moment introduced by said adjustable support member, said mounting portion including first and second arcuate edges generally parallel to one another, said mounting bracket further including a tab portion pivotally interconnected to a second end of said adjustable support member.

16. The window assembly of claim 15, wherein said tab portion is integrally formed with said curvilinear portion.

17. The window assembly of claim 15, wherein said inner surface of said glass panel is concavely curved in a direction perpendicular to the longitudinal axis of the vehicle.

18. The window assembly of claim 17, wherein said curvilinear mounting portion includes a plurality of spaced apart embossments extending toward said glass panel.

19. The window assembly of claim 18, wherein said tab portion outwardly extends from said curvilinear mounting portion adjacent said first arcuate edge.

20. The window assembly of claim 19, wherein said first arcuate edge is an inner arcuate edge.

\* \* \* \* \*